(12) United States Patent
Simoens

(10) Patent No.: US 6,830,230 B2
(45) Date of Patent: Dec. 14, 2004

(54) AIR BLAST DEVICE

(76) Inventor: Herve Simoens, 40, avenue Foch, 59700, Marco en Barqeul (FR)

( * ) Notice: Subject to any disclaimer, the term of this patent is extended or adjusted under 35 U.S.C. 154(b) by 24 days.

(21) Appl. No.: 10/443,847

(22) Filed: May 23, 2003

(65) Prior Publication Data
US 2003/0218146 A1 Nov. 27, 2003

(30) Foreign Application Priority Data
May 24, 2002 (FR) .......................................... 02 06374

(51) Int. Cl.$^7$ .............................................. F16K 31/12
(52) U.S. Cl. ..................... 251/30.03; 251/357; 251/360
(58) Field of Search ........................... 251/30.03, 30.04, 251/357, 360, 30.01

(56) References Cited

U.S. PATENT DOCUMENTS

| | | | |
|---|---|---|---|
| 2,398,775 A | * 4/1946 | Beekley et al. | 251/30.03 |
| 3,114,532 A | * 12/1963 | Gray et al. | 251/30.01 |
| 4,201,362 A | 5/1980 | Hideaki et al. | |
| 6,253,784 B1 | * 7/2001 | Simoens | 251/30.01 |
| 6,390,442 B2 | * 5/2002 | Tokuda et al. | 251/357 |

FOREIGN PATENT DOCUMENTS

| | | |
|---|---|---|
| DE | 12 59 160 B | 1/1968 |
| FR | 2 660 394 A | 10/1991 |
| GB | 2 067 269 A | 7/1981 |
| GB | 2 226 429 A | 6/1990 |
| WO | WO 97 43195 A | 11/1997 |

* cited by examiner

Primary Examiner—John Bastianelli
(74) Attorney, Agent, or Firm—Miles & Stockbridge P.C.; Edward J. Kondracki

(57) ABSTRACT

The invention relates to an air blast device comprising an air flow control device disposed between an inlet conduit and an outlet conduit. The control device comprises an evacuation valve (16) that controls the flow of the air contained in a rear chamber to the outlet conduit (5). The air contained in the rear chamber serves to hold a main valve (2A) in its seat (2B).

This blast device is characterized in that a seat (17) of an evacuation valve is located at the level of a front face (2C) of the main valve (2). In order to evacuate air contained in the rear chamber, evacuation valve moves toward the front in the direction opposite that of the main valve (2A) as it leaves its seat (2B).

21 Claims, 5 Drawing Sheets

AIR BLAST DEVICE

CROSS REFERENCE TO RELATED APPLICATION

The subject matter of this application is related to application Ser. No. 10/443882 filed concurrently herewith in the name of Herve SIMOENS. entitled "Air Blast Device With Improved Ejection Conduit" and corresponding to French Application No. FR02/06369, filed May 24, 2002, the subject matter of which is hereby incorporated by reference.

FIELD OF THE INVENTION

The invention relates to an air blast device.

BACKGROUND OF THE INVENTION

In various applications, it is necessary to remove accumulations of materials that impair the proper functioning of the installation.

Such is the case in cement works or bulk materials silos that are emptied by gravity.

To do this, instead of using purely mechanical means like a metal bar manipulated by an individual, it is known to use air blast devices.

The principle of these devices consists of filling a reservoir or a container with air at a given pressure and to allow the air to escape suddenly so as to produce a blast.

Under the effect of the blast, the accumulations of materials are broken up.

The advantage of these devices consists in the fact that they can function automatically and be disposed in places that are not readily accessible.

The known devices comprise a device for controlling the flow of a gaseous fluid established on a course linking the gaseous fluid accumulator and possibly an ejection nozzle.

Thus, conventionally, the blast device comprises a body housing a piston whose front face closes a so-called outlet port that opens into an outlet conduit, this body having an inlet conduit that connects it to the reservoir or container.

Throughout the filling period of the container, the rear face of this piston is subjected to a pressure that holds the piston over the outlet.

When the pressure maintaining the pressure on the piston is released, the latter suddenly moves back and allows the fluid to pass from the container to the outlet conduit, which may or may not incorporate a nozzle.

In the devices known to date, the outlet conduit has a constant cross-section along its longitudinal axis identical to that of the port between the container and the body of the device.

However, quite often, the geometry of the outlet conduit is different along the axis, i.e., at the level of the area to which the piston is applied, the cross-section of the outlet conduit is circular, sometimes evolving into an ellipse.

The efficiency of these devices is directly linked to the discharge speed of the air contained in the reservoir.

This ejection speed specifically depends on the opening speed of the piston.

Thus, we conceived of making the piston lighter.

To do this, the latter is given the shape of a cup, particularly a truncated one, whose convex front face closes the outlet port and whose concave rear face supports a means for guiding it with the body of the device.

This guiding means is preferably reduced to a slider that moves inside a guide attached to rear of the body.

This makes it possible both to make the piston lighter and to reduce friction by reducing the guide surfaces.

Particularly for purposes of installing these blast devices, it is convenient for the inlet conduit that connects the fluid flow control device to the container to be approximately perpendicular to the outlet conduit.

This also makes it possible to limit the distance between the inlet and the outlet.

Along its course, there is necessarily a loss of pressure that reduces the efficiency of the device.

It is of course possible to increase the efficiency of these devices by increasing the volumetric capacity of the reservoir or by increasing the pressure of the air contained in the reservoir, but this is not always possible, either for economic reasons or because of the installation of the blast devices.

Another problem results from the noise produced by the evacuation of the air contained in the rear chamber.

In order to reduce the noise during the emptying of the rear chamber, it is thus known to evacuate the air contained in this chamber, either directly or indirectly, into the outlet conduit.

To do this, it is known from U.S. Pat. No. 4,201,362 to equip the front pace of the piston with a series of valves disposed one behind the other.

Such an assembly results in an increase in the weight of the main valve, and hence a loss of efficiency in the device.

SUMMARY OF THE INVENTION

The invention proposes to offer a solution for improving the efficiency of the aforementioned systems.

To this end, the subject of the invention is an air blast device comprising an air flow control device disposed between an inlet conduit and an outlet conduit, which control device comprises a so-called evacuation valve that controls the flow of the air contained in a so-called rear chamber to the outlet conduit, this air holding a main valve in its seat, this blast device being characterized in that the seat of this evacuation valve is located at the level of the front face of the main valve, and in order to evacuate the air contained in the rear chamber, the so-called evacuation valve moves forward, in the direction opposite that of the main valve as it leaves its seat.

BRIEF DESCRIPTION OF THE DRAWINGS

The invention will be clearly understood with the help of the following description given as a nonlimiting example in reference to the attached drawing, which schematically represents.

DESCRIPTION OF THE PREFERRED EMBODIMENT(S)

Figure 1:
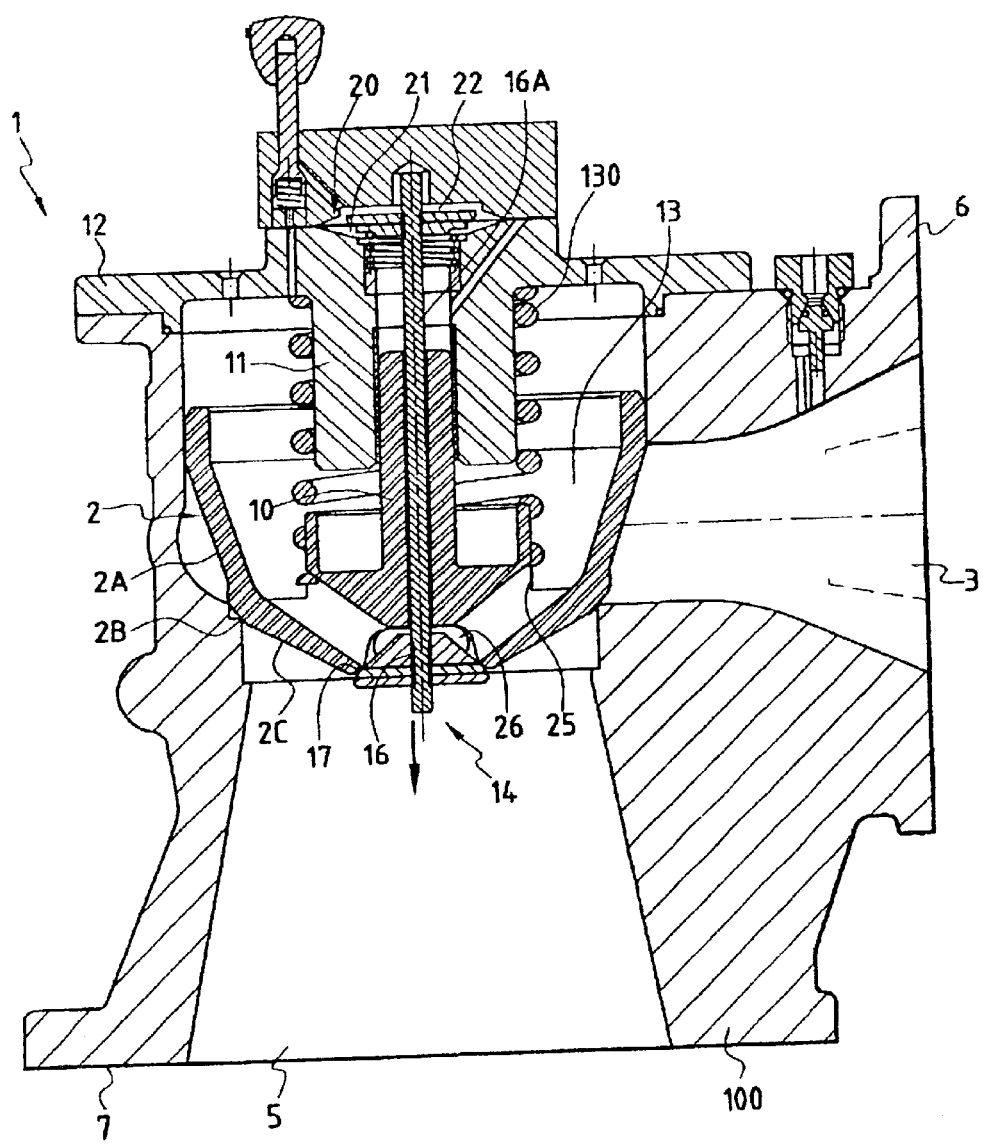
FIG. 1: a cutaway view of an air blast device.

Referring to the drawing, we see an air blast device 1 comprising an air flow control device 2 disposed between an inlet conduit 3 designed to be connected to a container 4 designed to accumulate a volume of air and an outlet conduit 5.

In order to attach the container to the device, it is arranged, for example, for the inlet conduit of the body of the device to be equipped with a flange 6.

A second flange 7 is generally provided for connecting the outlet conduit to a wall or to a nozzle.

Conventionally, the control device 2 is constituted by a main valve 2A which, pressed into a seat 2B, can move away from it in order to allow the air coming from the container 4 to move freely to the outlet conduit 5, which may incorporate a nozzle, the assembly still being called an outlet conduit.

In the example represented, the main valve 2A is in the form of a piston or a cup, possibly a truncated one, whose front face 2C presses against a seat 2B.

This front face 2C is therefore located on the convex face of the cup.

This piston or cup closes the entry of the outlet conduit.

As may be seen, the inlet conduit 3 opens laterally into the body 100 of the device.

The valve is translationally guided.

For this purpose, in the examples presented, particularly in the case of the cup-shaped valve, the rear face of the cup supports a slider 10 that cooperates with a guide 11 presented by the body of the blast device.

This guide is for example supported by a part 12 of the wall of the body of the device that is removable.

In order to fill the container, an air inlet opens:

either into the rear chamber 13 of the body of the device, and the clearance between the lateral wall of this chamber and the cup makes it possible to supply the container with air, or into the inlet conduit, in which case it is still the aforementioned clearance that makes it possible to supply the rear chamber so as to apply the piston or the cup.

A double supply of both the rear chamber and the container is also an available solution.

Quite often, a means 130 for returning the main valve to its closed position is provided, but this is not mandatory.

A device 14 makes it possible to evacuate the air contained in the rear chamber in order to move the cup or piston back.

To improve the blast, it is necessary for the main valve to open up the access to the outlet conduit quickly, and therefore it is necessary to evacuate the air contained in the rear chamber equally quickly.

To do this, conventionally, the device 14 is equipped with a so-called evacuation valve 16 that controls the flow of the air contained in the rear chamber 13, particularly to the outlet conduit 5.

When the air from this rear chamber 13 is evacuated, the main valve 2A moves back so as to open the passage.

According to the invention, the seat 17 of this evacuation valve 16 is located at the level of the front face 2C of the main valve 2A, and in order to evacuate the air contained in the rear chamber, the so-called evacuation valve 16 moves forward, in the direction opposite that of the main valve 2A as it leaves it seat.

This technical disposition is very advantageous.

In fact, first of all, the noise caused by the release of the air contained in the rear chamber is no longer perceived and merges with the blast because it is not sent to the outside as before, and secondly, the valve's forward movement each time removes any possible buildup on the front face of the cup.

A third advantage consists in the fact that the evacuation valve 16 is separate from the main valve 2A so that the latter is lighter and can therefore move back faster.

This evacuation valve 16 is borne by the end of a control rod 16A translationally guided through the particularly truncated cup.

The end of this valve rod 16A is connected to a drive means 20 for inducing its movement.

In one embodiment, the drive means 20 is an electromechanical device that presses on or drives the valve rod in the desired direction.

In another embodiment, this drive means 20 is a deformable membrane which, when subjected to a pressure exerted in a so-called control chamber 21, can move so as to drive the movement of the rod.

A chamber 22, located opposite the one which, as it fills, causes the evacuation valve to open, is supplied with air at the same pressure as the rear chamber in order to facilitate holding the valve 16 in its seat.

The valve rod 16A thus passes through the guide and the slider.

A return spring 23 returns the evacuation valve into position in its seat.

This return spring is housed in a bore included in the guide.

As may be seen, this guide 11 is supported by the rear face of the body of the blast device.

In order to transfer the air contained in the rear chamber to the opening bordered by the seat of the evacuation valve, the possibly truncated cup has evacuation channels 25 that open into a so-called front chamber 26 housing a part of the evacuation valve.

Advantageously, the concave part of the cup 2A forms a shape delimiting a trough 30 whose concavity is turned toward the rear of the body of the device facing the guide, and this trough and the guide form, in the retracted position of the cup, a so-called compression chamber 31 forming a buffer for the backward movement of said cup.

A return spring of the truncated cup presses the latter into its seat.

Figure 2:
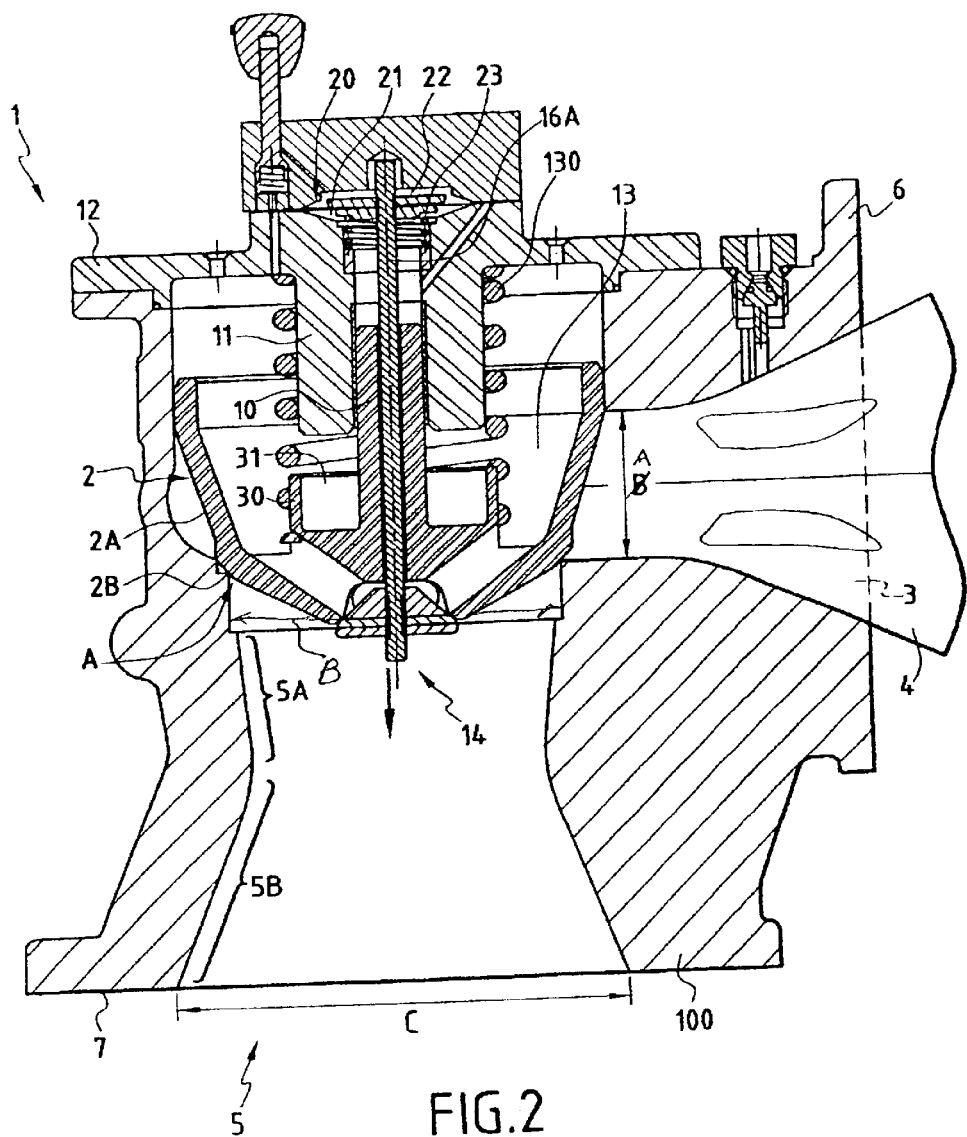
FIG. 2: a variant of embodiment of the device according to claim 1.
Figure 3:
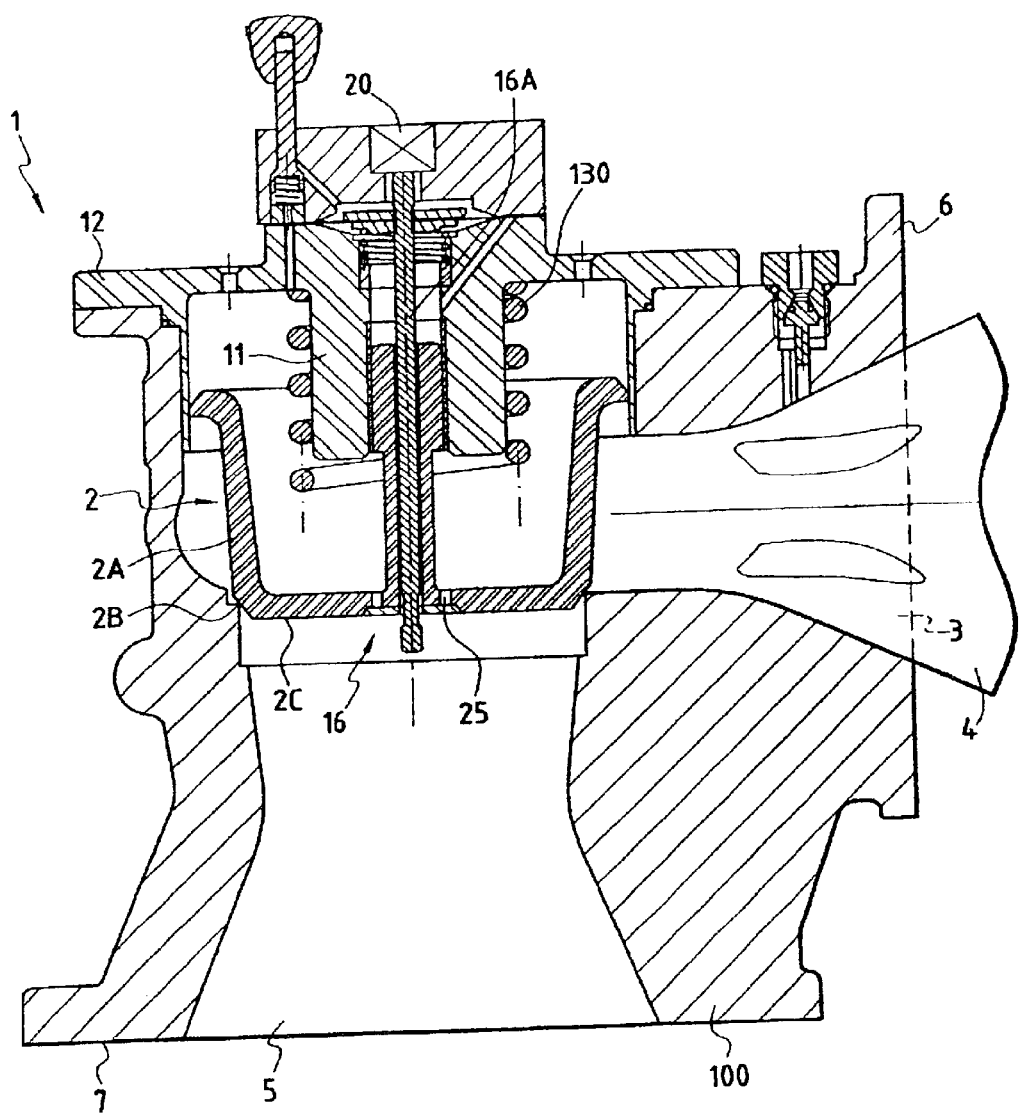
FIG. 3: a variant of the blast device in partial section.

As may be seen in FIGS. 1 and 2, the cup 2A includes three stages.

The rear stage is cylindrical in rotation with a radius that is constant along the longitudinal axis.

The other two stages are also cylindrical in rotation, but the radius varies along the longitudinal axis, decreasing toward the front of the cup.

Figure 5:
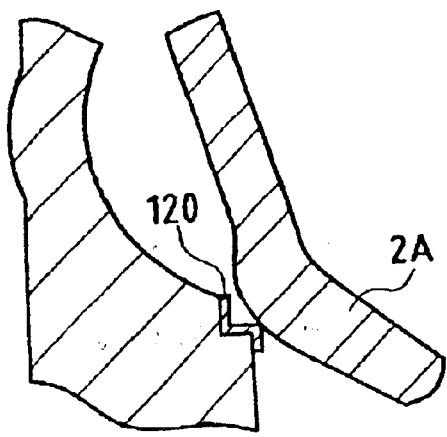

The seat 2B of the cup 2A is machined, into the body of the device, but preferably, as shown in FIG. 5, this seat is formed by a collar 120 mounted inside the body of the device in order to facilitate maintenance.

Figure 6:
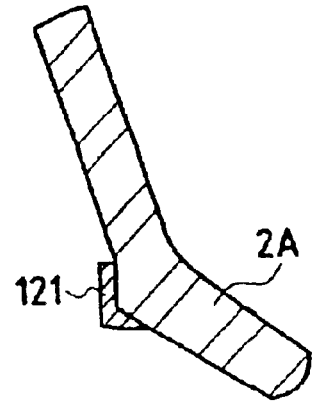
Figure 7:
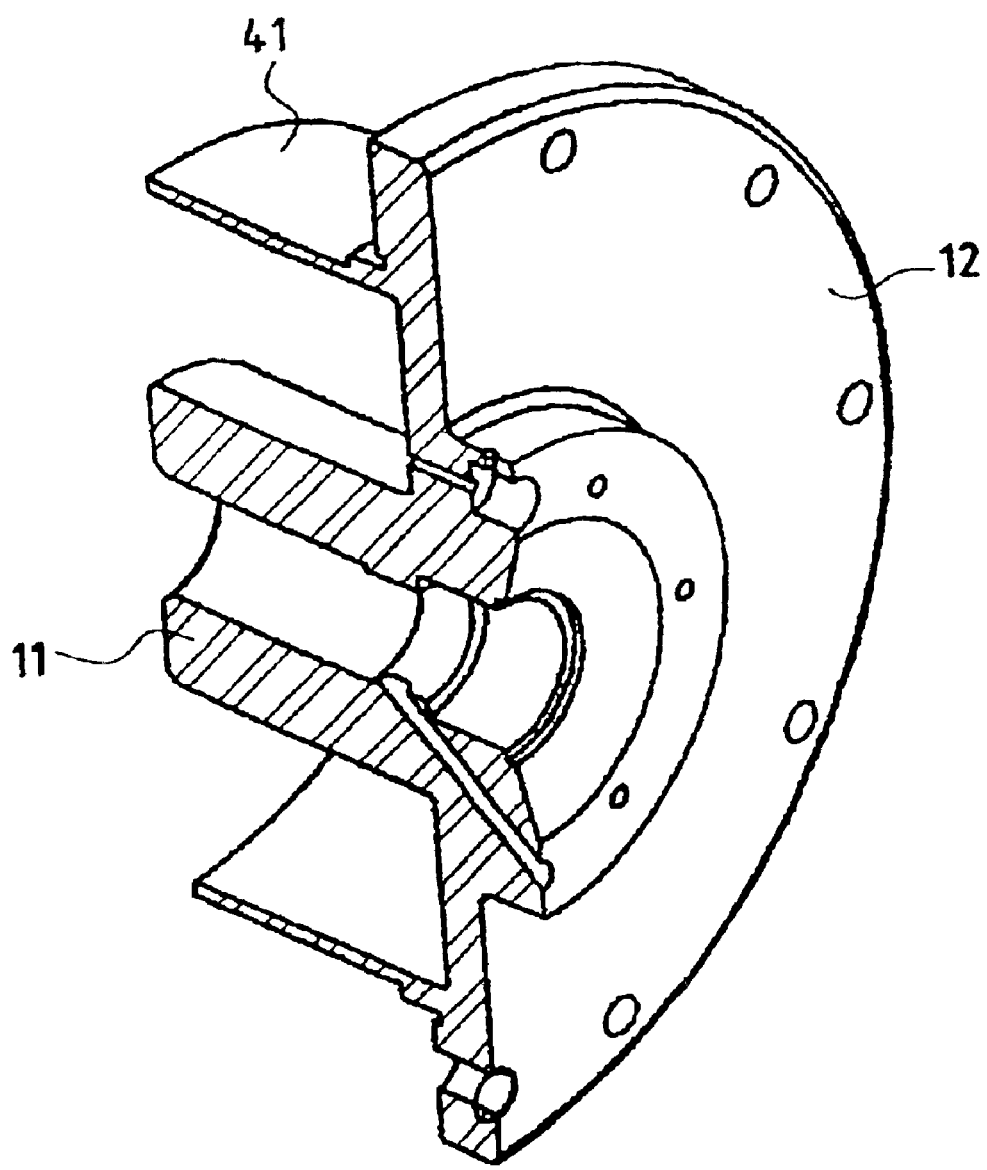
FIG. 7: a cutaway view of a piece of the rear of the cannon according to FIG. 3.

Another variant is shown in FIG. 6 and consists of providing a collar 121 mounted on the cup 2A.

These collars 120 or 121 are made of a material that is less hard or softer than those which come into contact with the main valve or the body of the device in order to constitute expendable parts that are easy to replace.

Figure 4:
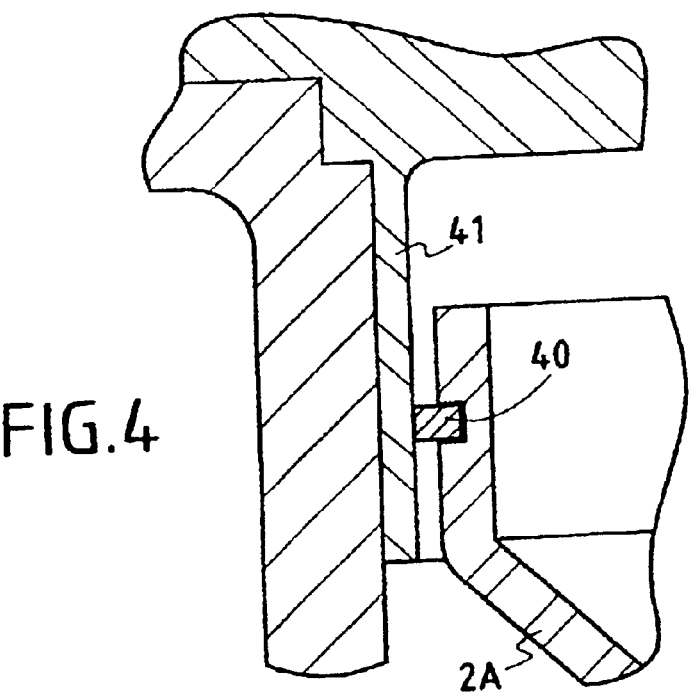
FIGS. 4 through 6: various details of embodiment.

As may be seen in FIG. 4, a gasket 40 is provided on the rear stage of the valve.

This gasket, which is not expected to provide a perfect seal, makes it possible to reduce the working clearance to about two- to three-tenths of a millimeter.

The clearance of each side can therefore be greater, which prevents the piston or the cup from jamming.

In one advantageous embodiment, as shown in FIG. 4, instead of having the rear stage of the cup 2A cooperate with a slight working clearance with the body of the device, this rear stage cooperates with a liner 41, this liner being mounted inside the body, though preferably this liner is supported by the rear wall.

Referring to FIG. 2, according to one characteristic of the invention, the area C of the cross-section of the outlet conduit measured at its distal end is greater than the area A of the cross-section of the inlet conduit measured at its end located near the flow control device. Stated another way, the diameter of the outlet conduit at the distal end is greater than the diameter.

The term distal end is understood to mean the end of the outlet conduit furthest from the cup or piston.

Advantageously, the area B of the cross-section of the outlet conduit measured at its proximal end at the level of the seat of the piston or cup is identical to the area A of the cross-section of the inlet conduit measured at its end located near the flow control device.

The cross-section C of the distal end of the outlet conduit is greater than the cross-section B of said section measured in its proximal part.

Advantageously, as shown in FIG. 2, the outlet conduit comprises, in the direction of evacuation of the air, a convergent section 5A followed by a divergent section 5B.

This arrangement makes it possible to increase the speed of the air at the level of the narrowing and hence to improve the blast.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. Air blast device comprising an air flow control device disposed between an inlet conduit and an outlet conduit, said air flow control device comprises a first main valve (2A), a rear chamber (13) defined by said first valve and an evacuation valve (16) that controls flow of the air contained in the rear chamber (13) to an outlet conduit (5), said air contained in the rear chamber holding the main valve (2A) in a first seat (2B), said main valve being movable away from said first seat in response to actuation of said evacuation valve, a second seat (17) for said evacuation valve (16) located at the level of a front face (2C) of the main valve (2A), and wherein said evacuation valve (16) is adapted to move forward in a direction opposite that of the main valve (2A) as said main valve leaves the first seat (2B) in order to evacuate the air contained in the rear chamber.

2. Air blast device according to claim 1, characterized in that the evacuation valve (16) is supported at the end of a control rod (16A) translationally guided through the main valve (2A), and the end of said control rod (16A) is connected to a drive (20) for inducing movement of the control rod.

3. Air blast device according to claim 2, characterized in that the drive (20) is electromechanical constructed and arranged to press on or drive the valve control rod (16A) in the desired direction.

4. Air blast device according to claim 2, further comprises a deformable membrane which, when subjected to a pressure exerted in a control chamber (21), moves so as to drive movement of the valve control rod (16A).

5. Air blast device according to claim 2, characterized in that the main valve (2A) is a cup and said cup has at its rear a slider (10) that cooperates with a guide (11).

6. Air blast device according to claim 5, characterized in that said cup includes a concave part forming a trough (30) whose concavity is turned toward the rear of the body of the device facing a guide, and this trough (30) and the guide form, in the retracted position of the cup (2A), a so-called compression chamber (31) forming a buffer for the backward movement of said cup.

7. Air blast device according to claim 1, characterized in that the first seat (2B) of the valve (2A) comprises a collar (120) mounted inside the body of the blast device.

8. Air blast device according to claim 1, characterized in that a collar (121) is mounted on the main valve (2A).

9. Air blast device according to claim 5, characterized in that a gasket (40) is provided on the rear stage of the valve.

10. Air blast device according to claim 5, characterized in that instead the air flow control device includes a liner (41) on the body of the device, said valve (2A) having a rear stage, the rear stage valve being disposed to cooperate with a slight working clearance with the body of the device, such that said rear stage cooperates with the liner (41).

11. Air blast device according to claim 10, characterized in that the liner (41) is mounted inside the body and is supported by the rear wall.

12. Air blast device according to claim 1, characterized in that the outlet conduit measured at its distal end has a cross sectional area (C) greater than a cross-section of area (A) of the inlet conduit measured at an end located adjacent the flow control device.

13. Air blast device according to claim 12, characterized in that the outlet conduit comprises, in the direction of evacuation of the air, a convergent section (5A) followed by a divergent section (5B).

14. Air blast device according to claim 10, characterized in that the first seat (2B) of the valve (2A comprises a collar (120) mounted inside the body of the blast device.

15. Air blast device according to claim 10, characterized in that a collar (121) is mounted on the main valve (2A).

16. Air blast device according to claim 11, characterized in that the first seat (2B) of the valve (2A comprises a collar (120) mounted inside the body of the blast device.

17. Air blast device according to claim 11, characterized in that a collar (121) is mounted on the main valve (2A).

18. Air blast device according to claim 12, characterized in that the first seat (2B) of the valve (2A comprises a collar (120) mounted inside the body of the blast device.

19. Air blast device according to claim 12, characterized in that a collar (121) is mounted on the main valve (2A).

20. Air blast device according to claim 13, characterized in that the first seat (2B) of the valve (2A comprises a collar (120) mounted inside the body of the blast device.

21. Air blast device according to claim 13, characterized in that a collar (121) is mounted on the main valve (2A).

* * * * *